US007458002B2

(12) United States Patent
Fischer et al.

(10) Patent No.: US 7,458,002 B2
(45) Date of Patent: Nov. 25, 2008

(54) PROCESSOR HAVING ELECTRONIC FUSES FOR STORING SECRET DATA

(75) Inventors: Wieland Fischer, Munich (DE); Jean-Pierre Seifert, Hillsborough, OR (US)

(73) Assignee: Infineon Technologies AG (DE)

( * ) Notice: Subject to any disclaimer, the term of this patent is extended or adjusted under 35 U.S.C. 154(b) by 147 days.

(21) Appl. No.: 11/357,714

(22) Filed: Feb. 17, 2006

(65) Prior Publication Data

US 2006/0215433 A1     Sep. 28, 2006

Related U.S. Application Data

(63) Continuation of application No. PCT/EP2004/008356, filed on Jul. 26, 2004.

(30) Foreign Application Priority Data

Aug. 19, 2003   (DE)   ................. 103 38 032

(51) Int. Cl.
*G11C 11/00* (2006.01)
(52) U.S. Cl. ...................................... 714/746
(58) Field of Classification Search .................. 714/746
See application file for complete search history.

(56) References Cited

U.S. PATENT DOCUMENTS

| 5,086,216 | A | | 2/1992 | Mollet et al. |
|---|---|---|---|---|
| 5,530,753 | A | * | 6/1996 | Easter et al. ................ 713/191 |
| 5,563,950 | A | | 10/1996 | Easter et al. |
| 5,889,679 | A | | 3/1999 | Henry et al. |
| 6,279,129 | B1 | * | 8/2001 | McConnell et al. ......... 714/718 |
| 6,301,674 | B1 | * | 10/2001 | Saito et al. .................. 713/340 |
| 6,386,456 | B1 | | 5/2002 | Chen et al. |
| 6,907,560 | B2 | * | 6/2005 | Gagnon ..................... 714/776 |
| 2003/0110349 | A1 | | 6/2003 | Zimmerman et al. |
| 2003/0126513 | A1 | | 7/2003 | Wuldart |
| 2003/0131210 | A1 | | 7/2003 | Mueller |
| 2003/0154384 | A1 | | 8/2003 | Mueller |

FOREIGN PATENT DOCUMENTS

| EP | 0 297 209 A2 | 1/1989 |
|---|---|---|
| WO | WO-02/19427 A2 | 3/2002 |

OTHER PUBLICATIONS

"Fuse, Antifuse, and Prom Technologies". Book: "Nonvolatile Semiconductor Memories Technologies, Design, and Applications". Part 2. Page 11. Edited by Chenming Hu. IEEE Press. Published 1991.

* cited by examiner

*Primary Examiner*—Jacques Louis-Jacques
*Assistant Examiner*—Enam Ahmed
(74) *Attorney, Agent, or Firm*—Dickstein, Shapiro, LLP.

(57) ABSTRACT

A processor includes a calculator, a plurality of electronic fuses for storing secret data and reader for reading out the plurality of electronic fuses to determine the secret data. By storing the secret data, like for example a secret key for the identification of the processor or a chip card, respectively, in which the processor is arranged, in electronic fuses, a secure and efficient and simultaneously flexible way for introducing sensitive information into an integrated circuit is achieved.

12 Claims, 2 Drawing Sheets

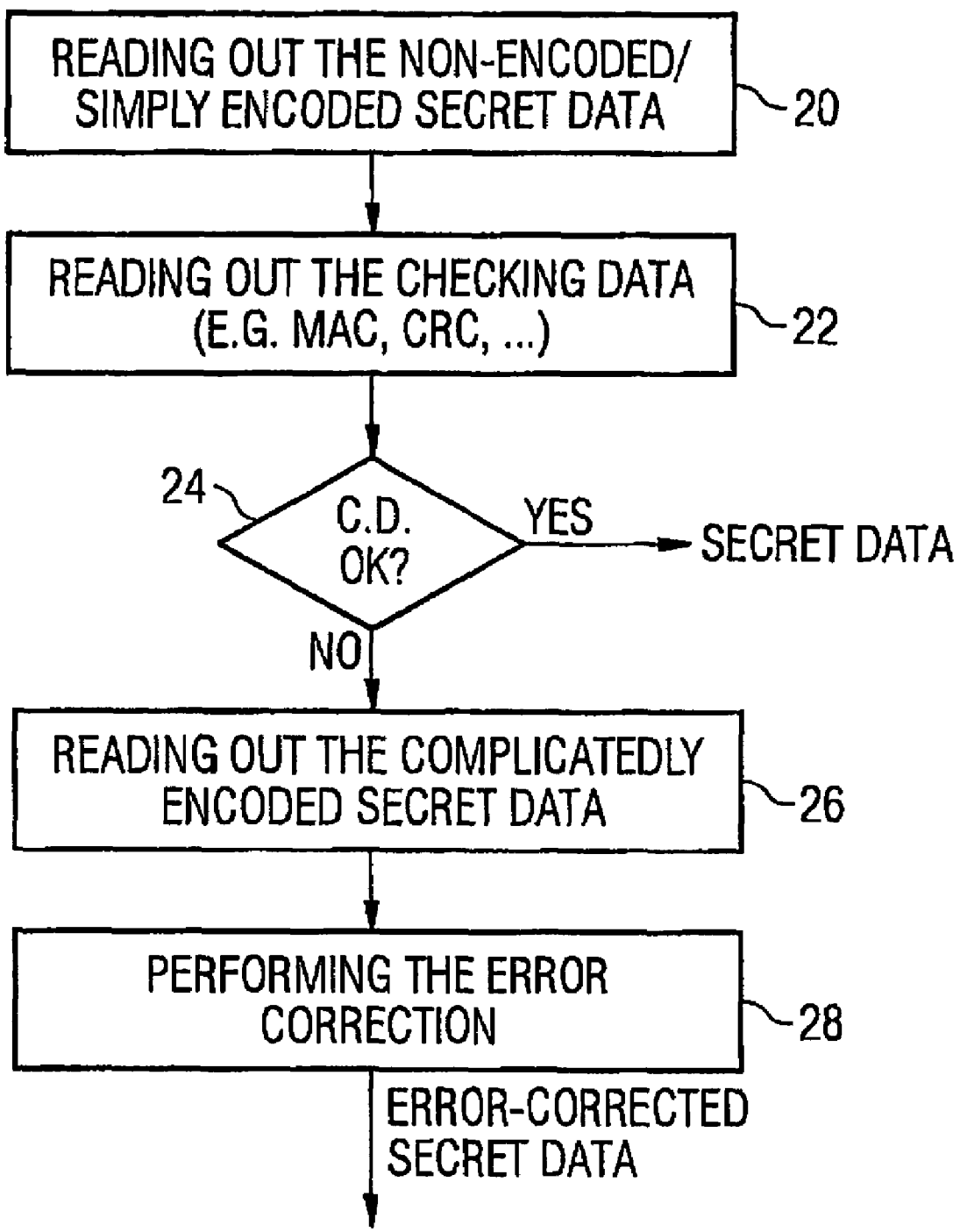

PROCESSOR HAVING ELECTRONIC FUSES FOR STORING SECRET DATA

CROSS-REFERENCE TO RELATED APPLICATION

This application is a continuation of copending International Application No. PCT/EP04/008356, filed Jul. 26, 2004, which designated the United States and was not published in English, and is incorporated herein by reference in its entirety.

BACKGROUND OF THE INVENTION

1. Field of the Invention

The present invention relates to processors and in particular to processors for chip card applications, on which secret data, like for example keys or identification data, is stored.

2. Description of Related Art

Chip cards usually include a chip, which in turn includes both a CPU and also periphery elements, like for example a crypto-co-processor, a working memory, a read-only-memory, etc. Typical chips for chip cards further include a non-volatile memory as a read-only memory. Non-volatile memories (NVMs) are used to store secret data for the device, which the non-volatile memory is associated with. Such secret data is for example secret keys, which are unique for the chip and thus for the chip card on which the chip is placed. Such chip cards for example identify users for mobile telephones in which they are integrated. Alternatively, the chip card itself may be used for a personal identification, for example in the form of a payment card, a health card, a bankcard, etc.

Within such chips, during delivery or even in manufacturing, respectively, non-volatile memories existing on the chip are for example programmed in the form of an ROM. The programming of ROMs usually takes place using an ROM mask, which is one of the last masks for chip card manufacturing. Alternatively, also EPROMs or EEPROMs may be used as non-volatile memories, which do not have to be programmed by an individual mask in chip manufacturing but may be programmed electronically, for example by applying a very high voltage to bring charge onto an isolated gate of a transistor via tunneling.

Such non-volatile memories for storing device-unique secret data, like for example a PIN of a carrier of the card or a secret key for a card for an asymmetric encoding/signature method are undesirable in several regards. On the one hand, manufacturing the same is expensive. Further, programming of those memories is very cost and time consuming. In typical ROMs, which are programmed using an ROM mask during manufacturing, flexibility is especially low as the programming data for the read-only memory already has to be known when manufacturing the cards.

The use of EPROMs or EEPROMs is more flexible, however. On the other hand, in card programming relatively high voltages have to be applied in order to bring charges to isolated gates of the memory transistors. In particular with low-cost applications, the risk is especially high that due to the high voltages to be applied, which are substantially higher than any operating voltages for the chip card, neighboring circuit parts may be affected or even destroyed in programming. In order to prevent this, the circuits have to be implemented especially voltage-resistant although typical operating voltages for the chip cards are substantially below the voltage level, which is required to program the non-volatile memory.

It is a further disadvantage, that non-volatile memories loose their memory state over time. In order to recognize when such a non-volatile memory may not be read-out correctly any more, thus again checking or testing circuits, respectively, have to be provided on the card. These checking circuits are then operable to signalize to a carrier of the card that the card will soon not be trusted any more and either has to be replaced or at least refreshed.

Non-volatile memories are further, as they are arranged in arrays and comprise a regular structure, a target easy to be found for an attacker, who unauthorizedly wants to extract data stored in the memory.

Thus, in future processors or processing secret data and in particular in future chips for chip cards including such processors for processing secret data attempts are made not to refrain from non-volatile memories for storing secret data.

SUMMARY OF THE INVENTION

It is an object of the present invention to provide a secure but low-cost processor means having stored secret data.

In accordance with a first aspect, the present invention provides a processor, having a calculator for processing payload data considering secret data presentable by binary information units; a plurality of electronic fuses for storing the secret data, wherein one fuse is implemented to store, in an integer state, a first binary value for a binary information unit, and to store, in a non-integer state, a second binary value for a binary information unit, wherein the first binary value is different from the second binary value; and a reader for reading out the plurality of electronic fuses in order to determine the secret data.

In accordance with a second aspect, the present invention provides a method for manufacturing a processor, with the steps of providing a calculator, a plurality of electronic fuses, and a reader for reading out the electronic fuses, wherein the plurality of electronic fuses is provided to store secret data that may be represented by binary information units; providing the binary information units representing the secret data; and burning certain fuses of the plurality of electronic fuses so that the certain fuses are brought into a non-integer state based on binary data of the binary information units including a certain binary value.

The present invention is based on the finding that many of the above-described problems may be solved by the fact that secret keys, i.e. device-unique secret data, is not stored in non-volatile memories (NVM) any more but using electronic fuses also referred to as e-fuses. An inventive processor means for this purpose includes a calculating means for processing payload data using secret data presentable by binary information units, an array of electronic fuses for storing the secret data, wherein one fuse is implemented to store, in an integer state, a first binary value for a binary information unit and to store, in a non-integer state, a second binary value for a binary information unit, and means for reading out arrays of electronic fuses to determine the secret data.

The present invention is advantageous in so far that electronic fuses may easily be manufactured as for an electronic fuse typically a line and a transistor is sufficient.

For burning the electronic fuses, i.e. for setting certain electronic fuses into a defect state, it is sufficient e.g. to apply a short voltage peak to the gate of the associated transistor to make the transistor conductive, as the gate oxide is through-alloyed. Such voltages are substantially lower and have to be applied substantially shorter than comparable voltages for programming an EEPROM transistor.

It is further advantageous that the electronic fuses may be manufactured identically for any processor means and that only then, after manufacturing, the device-specific secret data may individually be programmed into the chips, i.e. burnt in.

It is a further advantage of the present invention that the electronic fuses may be distributed at any location in an integrated circuit, so that it is not directly obvious for an attacker which transistor belongs to an electronic fuse and which transistor is a normal logic or working transistor of the integrated circuit. While memory arrays are well identifiable for an attacker on an integrated circuit, the electronic fuses may be distributed almost randomly across an integrated circuit without being arranged in an array, which may easily be found by an attacker.

It is a further advantage of electronic fuses that they do not have to be refreshed or post-programmed. If a fuse was burnt-through or blown correctly once, i.e. set into a defect state, then it will stay there independent of what happens with the integrated circuit.

It is to be noted here that chip cards have to be very robust as they are often not treated with care by carriers of the chip cards, while there is simultaneously an urgent requirement for them to function perfectly which is decisive in particular for secret keys which, if they are not read out correctly, lead to an overall break down, i.e. to a total failure of the card. This is in particular especially annoying for the user when a user wants to rely on his or her bankcard or mobile telephone, respectively.

It is a further advantage of the present invention that electronic fuses may be manufactured very cost-effectively, as for this purpose no especially high-quality transistors are required. Electronic fuses based on defect or non-defect transistors, respectively, only have to comprise transistors which are as good regarding quality, so that a defect state can be clearly differentiated from a non-defect state, i.e. from the integer state. Further, for manufacturing simple electronic fuses typically substantially less manufacturing steps are required than for manufacturing a non-volatile memory.

It is further advantage of the present invention that also the failure rate in manufacturing and thus the overall price of the chips may be reduced, as the amount of non-volatile memory compared to cards in which also secret information is stored in the non-volatile memory may be reduced. Thus, automatically also the probability decreases that the integrated circuit has be discarded from the beginning due to a failure of transistors from the non-volatile memory area, i.e. that the same represents rejects.

In one preferred embodiment of the present invention, the secret data is stored in a redundant way in the electronic fuses. This means, that an error correction code is used which enables recovering the originally stored information, although e.g. a certain number of bits of the bits burnt into the electronic fuses will still switch back. Such a backswitching of bits may happen by a so-called "annealing" of the burnt-through or blown transistors. This means that transistors were in fact damaged when burning, however not so severely that they are completely defect, so that certain bits of the secret data may switch into another position. In order to counteract this problem, in the preferred embodiment of the present invention, a storing of the secret keys, i.e. the secret data, is performed in a redundant way in order to be able to perform an error correction when reading out the secret data and when an error occurs.

BRIEF DESCRIPTION OF THE DRAWINGS

Preferred embodiments of the present invention will be detailed subsequently referring to the appended drawings, in which:

FIG. 2 shows a flow chart for reading out the secret data from the array of electronic fuses according to a preferred embodiment of the present invention using error correction.

DESCRIPTION OF THE PREFERRED EMBODIMENTS

Figure 1:
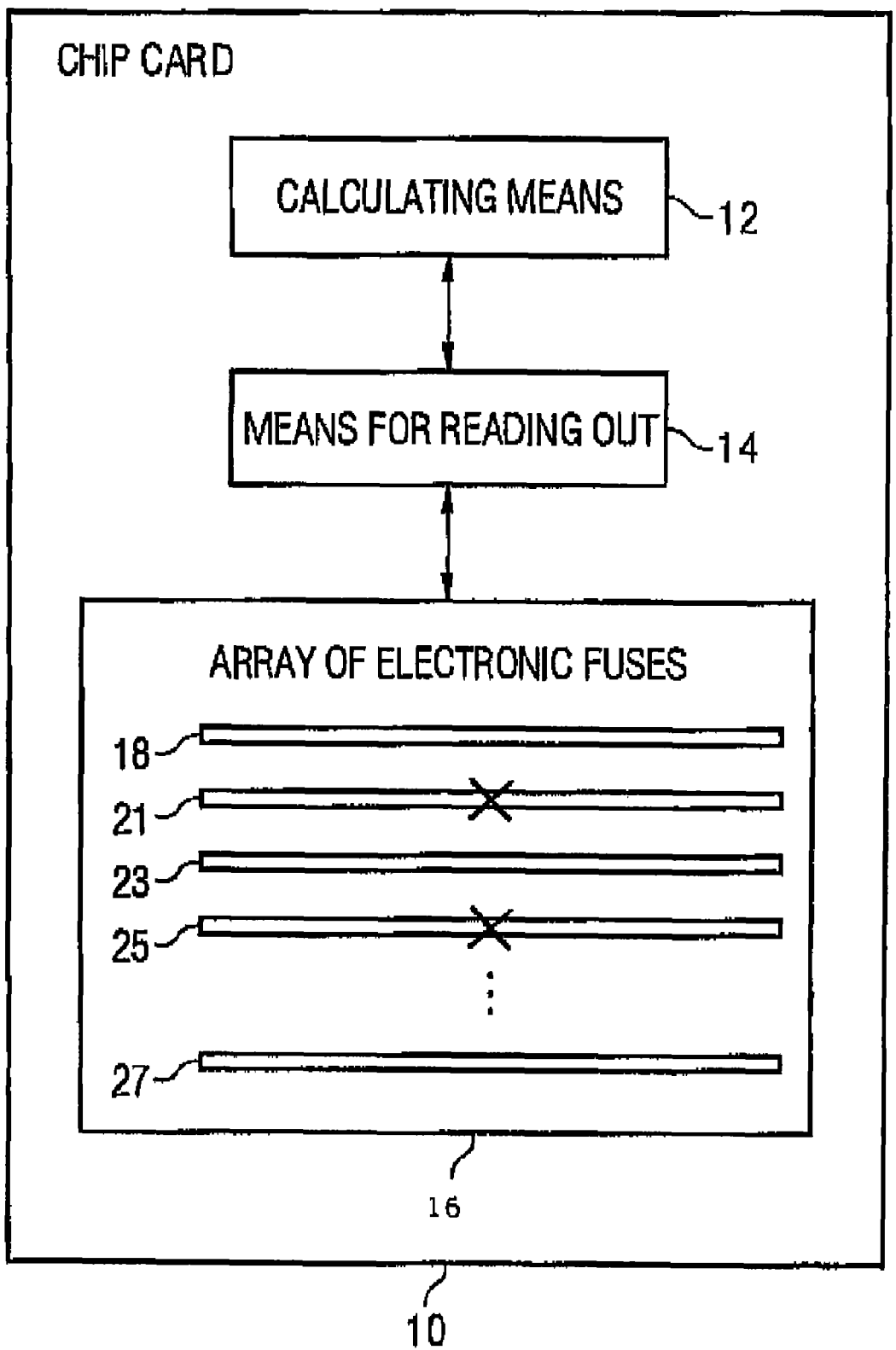
FIG. 1 shows a portion of a chip card according to the present invention.

FIG. 1 shows a chip card 10 having a processor means including a calculating means 12 for processing payload data considering secret data presentable by binary information units. Calculating means 12 is coupled to means 14 for reading out an array 16 of electronic fuses to determine secret data presented in the electronic fuses by binary information units. The array 16 of electronic fuses serves for storing secret data presentable by the binary information unit. The array of electronic fuses includes any number of individual fuses 18,21, 23,25,27. A fuse, like for example fuse 18, is implemented to present a first binary value for a binary information unit in its integer state. Another fuse, like for example fuse 20, is implemented to present a second binary value for a binary information unit in a non-integer state, i.e. a defect state as it is indicated by "x" in FIG. 1, wherein the second binary value is different from the first binary value. Thus, it is arbitrary whether an integer fuse stores a binary zero or a binary one. Further, it is arbitrary whether a non-integer fuse presents a binary zero or a binary one. zero or a binary one. Further, it is arbitrary whether a non-integer fuse presents a binary zero or a binary one.

In a preferred embodiment, the electronic fuses are manufactured transistor-based. Thus, a fuse might for example be implemented in the form of a self-inhibiting transistor, wherein with a voltage of zero at the gate of the self-inhibiting transistor no current flows across a transistor, i.e. a voltage applied to a source and drain decreases across the transistor. A corresponding defect fuse for this purpose could be manufactured e.g. by applying a very high voltage to the gate of the transistor, which is so high that the gate oxide burns through. In this case, the self-inhibiting transistor would become conductive which leads to the fact that a voltage applied between source and drain of the transistor does not decrease or that a current flows, respectively. Analog to this, in a self-inhibiting transistor also a voltage could be applied between gate and source which is below the turn-on voltage. In the case of an intact transistor, this voltage would not decrease, which would correspond to a first binary value. In case of the transistor in which the gate was burnt through the voltage would decrease, which would correspond to a second binary state.

It is to be noted that the electronic fuses may be implemented in any way, as it is known in the art.

For security reasons, it is preferred not to arrange the electronic fuses in a regular array but in a so to say random array, such that the electronic fuses are randomly distributed across the chip, so that an attack on the sensitive secret data stored in the electronic fuses becomes more difficult compared to the case in which the secret data is arranged in a regular memory array, for example in an NVM, which is easy to identify for an attacker.

According to the invention, thus the use of non-volatile memories (NVM) embedded into the chip card is prevented for storing the secret data. While in the prior art such embedded NVMs were used to store secret keys which were unique for the device, such information about certain secret keys, i.e. secret data, is stored by electronic fuses, which may individually be set, i.e. "burnt" after manufacturing the chip.

Such electronic fuses may bring along problems, however. A particular problem with certain electronic fuses is the quality during the burning process. It has further been found that burnt transistors are self-annealing, i.e. that certain bits of the secret data presentable by binary information units switched back into the other position after a certain time. As such problems lead to the fact that a system based on the secret keys completely breaks down, as no access to the integrated keys is possible any more, in one embodiment of the present invention a redundant storage of secret data is performed. The secret data is presented redundantly by binary information units stored redundantly in the electronic fuses. For generating the binary information units representing the secret data error correction methods, like for example FEC methods, are used to obtain redundantly encoded binary information units representing the secret data. These redundantly existing binary information units are then stored into the electronic fuses.

Preferably, a certain type of error correction codes is used, i.e. of error correction codes considering the following aspects in the redundant presentation of the secret data. Thus, the binary information units representing the secret data in a redundant way initially include an area in which the secret data is contained in clear or only very simply coded. Checking data is associated with this first area, like for example a check sum (e.g. a CRC), a fingerprint, a simple hash, or a simple MAC (MAC=Message Authentication Code).

The MAC or the CAC, or the finger print, respectively, or any other way regarding the presentation of the checking data serves for means for reading out 14 of FIG. 1 first reading out the simply encoded or non-encoded secret data from the first area of the electronic fuses. In addition to that, means for reading out reads the checking data, as it is illustrated with regard to FIG. 2 in a step 22. Reading out the non-encoded or simply encoded secret data, respectively, is represented by a step 20 in FIG. 2. Means 14 for reading out is then implemented to determine, using the checking data, whether the read-out non-encoded or read-out simply encoded secret data, respectively, present at the end of step 20, is intact or not. If it is determined that it is intact (the determination takes place in a decision block 24), the question in the decision block 24 is answered by "yes", and the secret data is already present, which means that the electronic fuses read-out in step 20 were not defective. If it is determined using the checking data, however, that the read-out non-encoded or the read-out simply encoded secret data contained in step 20 were erroneous, then comparatively complicatedly encoded secret data contained in the redundant binary information units and stored in a further area of electronic fuses are read-out in a step 26 and subjected to an error correction method to be selected randomly with regard to efficiency and complexity (step 28 in FIG. 2). After performing error correction using complex randomly settable error correction, then at the end of step 28 in FIG. 2 error-corrected secret data are presented.

The procedure illustrated in FIG. 2 is particularly advantageous if it is assumed that errors in the secret data occur relatively rarely. Then a readout of the secret data may take place quickly, as an error correction code does not always have to be performed, i.e. compared to the case in which storing the secret data took place only using a complicated code. With regard to the complexity of the error correction code, two-stage insertion of binary information units redundantly representing the secret data into the plurality of electronic fuses thus only leads to an error correction expense if an error actually occurred.

On the other hand, the combination of the non-encoded or simply encoded secret data, respectively, with checking data in the form of a CRC, an MAC, a finger print, etc. provides security in so far that a manipulation in the simply encoded secret data or the non-encoded secret data may easily be detected. A manipulation of the electronic fuses possibly performed by an attacker who detected an electronic fuse, which was not yet burnt, is then treated like an error by the inventive concept and is corrected in so far that a manipulation of the attacker is in vain.

If an attacker introduces too many errors, i.e. if he manipulates the secret data too much so that the error correction code fails, the attacker will be able to manipulate the secret data will, however, not be able to perform operations using the manipulated secret data, for example a manipulated PIN or a manipulated amount of money in a payment card, as step 28 will output an error so that the complete processor means becomes useless. This is in particular the case as then calculating means 12, as it has no correct key available, will perform no processing of payload data, as a processing of payload data according to the invention only takes place when secret data is detected to be error-free or was error corrected, respectively. Of course, calculating means 12 is implemented in order to only when step 28 of FIG. 2 provides a correct result process payload data at all. If step 28 of FIG. 2 provides an error signal, then calculating means 12 of FIG. 1 is blocked completely. Thus, the attacker will have achieved a manipulation of the electronic fuses, this manipulation will not be of any use to him, however, as the chip card built into the inventive processor means refuses operation completely.

In the preferred embodiment of the invention, the secret keys are thus stored redundantly in the electronic fuses. Consequently, an error correction code is used enabling a recovery of the originally stored information, although a certain number of bits were changed either by attacker manipulation or by an error in burning or after burning, respectively.

According to the invention, the secret data is thus not exclusively stored in clear but in encoded form, wherein the encoding took place by an error correction method.

It is to be assumed that the key K is to be stored. Instead of exclusively burning the key directly into the electronic fuses, the encoded information c=C(K) is burnt into the fuses. Here, C designates a certain error correction code enabling an efficient error correction reproduction of the original message K, i.e. from a changed value c' which is unequal c.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A processor, comprising: a calculator for processing payload data using secret data representable by binary information units; a plurality of electronic fuses for storing the secret data, wherein each fuse of a plurality of electronic fuses is implemented to store, in an integer state, a first binary value for a binary information unit, and to store, in a non-integer state, a second binary value for a binary information unit, wherein the first binary value is different from the second binary value, wherein the binary information units are so that they constitute a redundant representation of the secret data, and wherein the plurality of electronic fuses is adapted to store the binary information units, and a reader for reading out the plurality of electronic fuses in order to determine the secret data, wherein the reader is adapted in order to perform an error correction on the basis of the redundant representation of the secret data, whereby a binary information unit of the redundant representation of the secret data, which is stored by an electronic fuse being in an erroneous state, is corrected.

2. The processor according to claim 1, wherein the binary information units are implemented so that they encodedly represent secret data, wherein the encoded representation of the secret data is generated by encoding using an error correction code, and wherein the reader for reading out is implemented to determine the encoded representation of the secret data from the plurality of electronic fuses and then, using the error correction code, decode the encoded representation in order to obtain the secret data.

3. The processor according to claim 1, wherein the electronic fuses are implemented to irreversibly be in a non-integer state when they have been burnt.

4. The processor according to claim 1, wherein the plurality of electronic fuses comprise a fuse comprising a field effect transistor comprising a functioning gate oxide in the integer state and having a destroyed gate oxide in a non-integer state.

5. The processor according to claim 1, wherein the binary information units are implemented so that they comprise the secret data both in a non-encoded form or in a simply encoded form and also in a comparatively complicatedly encoded form, wherein checking information is associated with the secret data in a non-encoded form or in a simply encoded form, and wherein the reader for reading out is implemented in order to initially read-out the secret data in a non-encoded form or in a simply encoded form and to read out the checking information in order to determine, using the checking information, whether the secret data is error-free in the non-encoded form or in the simply encoded form, and in order to then, in case a corruption was determined, read out the secret data in the comparatively complicatedly encoded form and to then perform an error correction method to obtain error-corrected secret data.

6. The processor according to claim 5, wherein checking information includes an MAC, a CRC, or a hash.

7. The processor according to claim 5, wherein the reader is adapted in order to provide an error signal, when the error correction method does not provide a correction result, and wherein the calculator is adapted in order to be blocked in response to the error signal.

8. The processor according to claim 1, wherein the plurality of electronic fuses is distributed across an integrated circuit, in which the processor is implemented, in so far that at least a part of the plurality of electronic fuses is arranged irregularly within the integrated circuit.

9. The processor according to claim 1, which is implemented as a crypto-processor, wherein the secret data comprises a secret key for an identification of the crypto-processor.

10. A method for manufacturing a processor, comprising: providing a calculator, a plurality of electronic fuses, and a reader for reading out the plurality of electronic fuses, wherein the plurality of electronic fuses is adapted to store secret data being represented by binary information units, wherein the binary information units are so that they constitute a redundant representation of the secret data, and wherein the reader is adapted in order to perform an error correction on the basis of the redundant representation of the secret data, whereby a binary information unit of the redundant representation of the secret data which is stored by an electronic fuse being in an erroneous state, is corrected; providing the binary information units representing the secret data, wherein the binary information units are so that they constitute a redundant representation of the secret data and burning selected fuses of the plurality of electronic fuses so that the selected fuses are brought into a non-integer state based on binary data of the binary information units, the binary data being in a selected binary value, wherein, subsequent to the burning of the selected fuses, the plurality of electronic fuses store the binary information units, which constitute the redundant representation of the secret data.

11. The method according to claim 10, wherein providing the binary information units further comprises: encoding original secret data using an error correction code to obtain the binary information units redundantly representing the secret data, wherein the binary information units comprise a first area in which the secret data in a non-encoded form or a comparatively simply encoded form is comprised, and wherein the binary information units comprise a second area in which checking information for the first area is comprised, and wherein the binary information units comprise a third area, in which the secret data is represented in a comparatively complicatedly encoded form.

12. A method for reading out non-encoded/simply encoded secret data from an array of electronic fuses, comprising: reading out from the array of electronic fuses the non-encoded/simply encoded secret data, wherein each fuse of a plurality of electronic fuses is implemented to store, in an integer state, a first binary value for a binary information unit, and to store, in a non-integer state, a second binary value for a binary information unit, wherein the first binary value is different from the second binary value; reading out checking data; determining, using the checking data, whether the read-out non-encoded/simply encoded secret data is erroneous; if it is determined that the read-out non-encoded/simply encoded secret data is erroneous, then reading out comparatively complicatedly encoded secret data; and error correcting the comparatively complicatedly encoded secret data.

* * * * *